United States Patent
Wang et al.

(10) Patent No.: US 12,312,285 B2
(45) Date of Patent: May 27, 2025

(54) ECOLOGICAL RESTORATION METHOD FOR SEAWATER BACK-FLOWING FARMLAND IN TROPICAL REGION

(71) Applicant: HAINAN UNIVERSITY, Haikou (CN)

(72) Inventors: Xu Wang, Haikou (CN); Qingping Lin, Haikou (CN); Defa Su, Haikou (CN)

(73) Assignee: HAINAN UNIVERSITY, Haikou (CN)

( * ) Notice: Subject to any disclaimer, the term of this patent is extended or adjusted under 35 U.S.C. 154(b) by 824 days.

(21) Appl. No.: 17/622,718

(22) PCT Filed: Mar. 31, 2021

(86) PCT No.: PCT/CN2021/084487
§ 371 (c)(1),
(2) Date: Dec. 24, 2021

(87) PCT Pub. No.: WO2021/218552
PCT Pub. Date: Nov. 4, 2021

(65) Prior Publication Data
US 2022/0240435 A1    Aug. 4, 2022

(30) Foreign Application Priority Data
Apr. 30, 2020    (CN) .......................... 202010361697.0

(51) Int. Cl.
C05F 3/00      (2006.01)
A01G 22/00     (2018.01)
A01G 22/15     (2018.01)
A01G 22/20     (2018.01)
C05F 17/00     (2020.01)

(52) U.S. Cl.
CPC ............... C05F 3/00 (2013.01); A01G 22/00 (2018.02); A01G 22/15 (2018.02); A01G 22/20 (2018.02); C05F 17/00 (2013.01)

(58) Field of Classification Search
CPC ............ C05F 3/00; A01G 22/00; A01G 22/15
See application file for complete search history.

(56) References Cited

FOREIGN PATENT DOCUMENTS

| CN | 102057852 | A | * | 5/2011 | |
|----|-----------|---|---|--------|---|
| CN | 103444296 | A |   | 12/2013 | |
| CN | 103918466 | A | * | 7/2014 | |
| CN | 104488493 | A |   | 4/2015 | |
| CN | 105940905 | A | * | 9/2016 | |
| CN | 106561224 | A | * | 4/2017 | |
| CN | 106665034 | A | * | 5/2017 | |
| CN | 108702889 | A |   | 10/2018 | |
| CN | 108738458 | A |   | 11/2018 | |
| CN | 109588191 | A | * | 4/2019 | ............. A01B 79/02 |
| CN | 109590325 | A |   | 4/2019 | |
| CN | 109819746 | A |   | 5/2019 | |
| CN | 110204153 | A | * | 9/2019 | ................ C02F 9/00 |
| CN | 111512727 | A |   | 8/2020 | |
| RU | 2402897   | C2 |  | 11/2010 | |

OTHER PUBLICATIONS

Shackira AM and Puthur JT, "Enhanced Phytostabilization of Cadmium by a Halophyte—*Acanthus Ilicifolius*L." (2016) 19 International Journal of Phytoremediation 319 (Year: 2016).*
CN 102057852 A (machine translation) (Year: 2011).*
CN 103918466 A (machine translation) (Year: 2014).*
CN 105940905 A (machine translation) (Year: 2016).*
CN 106561224 A (machine translation) (Year: 2017).*
CN 106665034 A (machine translation) (Year: 2017).*
CN 109588191 A (machine translation) (Year: 2019).*
CN 110204153 A (machine translation) (Year: 2019).*
International Search Report issued in corresponding International application No. PCT/CN2021/084487, mailed Jun. 28, 2021.

* cited by examiner

*Primary Examiner* — Tara Mayo

(57) ABSTRACT

An ecological restoration method for seawater back-flowing farmlands in a tropical region includes the following steps: performing soil ridging on a seawater back-flowing saline-alkalized land by using a whole-mulching double-ridge model thereof, a ridge body that has been ridged is a trapezoidal structure, and perpendicular to a direction of a coastline; planting a salt-tolerant plant on ridges, and planting *Acanthus ilicifolius* in furrows. Salts on the ridges are rinsed into the furrows by means of natural precipitation and irrigation; the *Acanthus ilicifolius* that have been planted in the furrows excretes redundant salts by using salt glands; the salt-tolerant plant and the *Acanthus ilicifolius* are harvested to effectively remove salts, thereby achieving an effect of reducing salts in soil by a dual-function of the ridges and the furrows.

10 Claims, No Drawings

ECOLOGICAL RESTORATION METHOD FOR SEAWATER BACK-FLOWING FARMLAND IN TROPICAL REGION

BACKGROUND

1. Technical Field

The present disclosure generally relates to the technical field of ecological restoration of saline-alkalized land, and especially relates to an ecological restoration method for seawater back-flowing farmlands in a tropical region.

2. Description of Related Art

Since the 20th century, land salinization has developed rapidly in China, and salinization of cultivated lands is becoming more and more serious in China. The land salinization is a great reason for degradation of agricultural ecological environment. Hainan island belongs to tropical monsoon climate, farmland distribution with a large area is arranged along the coastline, because Hainan island is affected by northeast and southwest monsoon, tropical storms and typhoons are frequently occurred, and a phenomenon that seawater flows backward to the cultivated land sometimes is occurred; especially under the condition of strong typhoons, the phenomenon of seawater backflow is obvious, a large of areas of the farmland are damaged, a soil cultivation recovery period is long, and soil salinity is too high, which seriously endangers the growth of crops; furthermore, effective utilization of land resources in a southern coastal region is greatly limited, due to centralized distribution of population, small land cultivation areas, serious hardening of saline soil, poor structure and low fertility.

A conventional saline-alkalized land restoration technology mainly focuses on restoring agricultural production on the saline-alkalized land, and desalination efficiency is relatively slow. Generally, the saline-alkalized land can be improved by adding soil conditioners to the land, and planting salt-tolerant plants. These methods have played a role to some extent, but all have obvious disadvantages: a cost of the soil conditioner is high and an improvement effect is limited, so that the salt is solidified and a total amount of salt ions is not reduced, which can't solve the fundamental problem thereof, secondary pollution is likely to be caused, and new insecurity factors are brought to the soil; the salt-tolerant plants have certain requirements for a salinity range, and for the soil with a higher salinity, the salinity exceeds an optimal growth range of the salt-tolerant plants, the plants grow badly, which is limited to be utilized, and a removal effect of the salinity is slower. Moreover, possibility of storms is relatively high due to climate changes, so that an influence of backward flow can't be prevented for a long time. Therefore, an ecological restoration method is urgently needed, which can avoid using the traditional soil conditioner and can effectively restore the farmland that is back-flowed by seawater in the tropical region.

SUMMARY

The technical problems to be solved: in view of the shortcomings of the related art, the present disclosure relates to an ecological restoration method for seawater back-flowing farmlands in a tropical region which can effectively restore farmlands that have been back-flowed by seawater in the tropical region without using a traditional soil conditioner.

The technical solution adopted for solving technical problems of the present disclosure is: an ecological restoration method for seawater back-flowing farmlands in a tropical region according to an embodiment of the present disclosure includes: performing soil ridging on a seawater back-flowing saline-alkalized land by using a whole-mulching double-ridge model thereof, a ridge body that has been ridged is a trapezoidal structure, and perpendicular to a direction of a coastline; planting a salt-tolerant plant on ridges, and planting *Acanthus ilicifolius* in furrows. The present disclosure uses the whole-mulching double-ridge model thereof, sets the ridge body that has been ridged to be the trapezoidal structure, and perpendicular to the direction of the coastline; plants the salt-tolerant plant such as iced vegetable, new zealand spinach and endive, on the ridges, and plants the *Acanthus ilicifolius* in the furrows, which can effectively improve physical properties of the soil, improve porosity and organic matters of the soil, reduce salt content of the soil, and have a significant restoration effect on the farmlands that have been back-flowed by seawater in the tropical region.

Wherein before planting the salt-tolerant plant and the *Acanthus ilicifolius,* 4-6 kg/mu of fertilizer is applied on the ridges, and wherein the fertilizer is prepared by the following raw materials in parts by weight: 25-35 parts of cow dung, 30-50 parts of coconut chaff, 10-20 parts of seaweed residues, 20-30 parts of corn cob cores, 15-25 parts of banana stalk, 1-5 parts of derris roots and 2-4 parts of *Bacillus subtilis* powder. Preferably, the fertilizer is prepared by the following raw materials in parts by weight: 30 parts of cow dung, 38 parts of coconut chaff, 12 parts of seaweed residues, 25 parts of corn cob cores, 20 parts of banana stalk, 3 parts of derris roots and 2 parts of *Bacillus subtilis* powder.

Wherein a preparation method of the fertilizer includes the following steps: crushing the banana stalk, the corn cob cores and the derris roots, placing the banana stalk, the corn cob cores and the derris roots under a condition of 2.3 MPa for performing steam explosion for 10-12 minutes, to obtain steam explosion materials, adding the cow dung, the coconut chaff and the seaweed residues into the steam explosion materials for uniformly mixing, and then adding the *Bacillus subtilis* powder for further stirring and mixing, spraying water to wet the materials, and fermenting for 2-4 days, to obtain the target fertilizer.

Wherein the salt-tolerant plant includes one or more of corn, iced vegetable, new zealand spinach and endive. Preferably, the corn is planted on big ridges, and one or more of the iced vegetable, the new zealand spinach and the endive are planted on small ridges.

Wherein a width of the big ridge is 65-75 cm, a height of the big ridge is 13-16 cm, a width of the small ridge is 35-45 cm, a height of the small ridge is 18-22 cm, and a bottom width of the furrow is 8-10 cm. Preferably, the width of the big ridge is 70 cm, the height of the big ridge is 15 cm, the width of the small ridge is 40 cm, the height of the small ridge is 20 cm, and the bottom width of the furrow is 10 cm.

Wherein an average salt content of the seawater back-flowing farmlands in the tropical region before performing restoration is 2 to 3 percent.

Wherein the salt-tolerant plants selected by the present disclosure are as follows:

(1) the iced vegetable, a scientific name: ice leaf *Heliotrope* (a Latin name: *Mesembryanthum crystal* Linn.) is an annual or biennial herb of genus *Heliotrope* in the family of apricot, which has a certain ornamental value, and is a vegetable with a high nutritional value and a high economic value.
(2) The corn (a Latin name: *Zea mays* L.) is an annual herb of Gramineae and an important food crop. Compared with traditional food crops such as rice and wheat, the corn has strong drought tolerance, cold tolerance, barren tolerance and excellent environmental adaptability. The corn is an excellent food crop with a high nutritional value.
(3) The common *Tetragonia* herb, a scientific name: French spinach, New Zealand spinach, (a Latin name: *Tetragonia tetragonioides* (Pall) Kuntze), is an annual of genus *Heliotrope* in the family of apricot, which can be used as a vegetable, and is rich in iron, calcium, vitamin A and various vitamin B; a whole plant can be used for clearing heat and detoxification, dispelling wind and detumescence, treating enteritis, sepsis, sore redness and swelling, wind-heat and conjunctival congestion, etc, and has a high medicinal value.
(4) The endive, also known as a bitter vegetable (a scientific name: *Sonchus arvensis* L.) is a perennial herb of compositae, is an edible vegetable and favored by people because of its unique flavor. At the same time, the endive has a high medicinal value, and the whole plant can be used as medicine, with features of bitter and cold in nature, which has effects of clearing heat and detoxification, removing dampness and pus, cooling blood and hemostasis, and has functions of anti-bacteria, lowering a blood pressure, lowering cholesterol, anti-tumor, protect a liver.
(5) The *Acanthus ilicifolius* (*Acanthus ilicifolius* L.): also known as *Acanthus ilicifolius*, is an erect shrub in the family of Acanthus and is one of important medicinal plants in mangrove. The *Acanthus ilicifolius* has a high medicinal value and is widely used in treatment of acute and chronic hepatitis, rheumatism, snake wounds, etc., and has analgesic and anti-inflammatory effects. It is recorded in the Dictionary of Traditional Chinese Medicine that its taste is light, its root can be used as medicine, and it has effects of cooling blood and clearing heat, dispersing phlegm, detoxifying and relieving pain; the *Acanthus ilicifolius* not only provides habitat and food resources for birds, but also has functions of preventing wind and waves, promoting siltation and protecting beaches, and consolidating banks and embankments; in addition, the *Acanthus ilicifolius* has peculiar leaf shape and elegant color. It can be used as a coastal landscape plant and has a great economic effect.

The present disclosure provides the advantages as below.

On the basis of keeping the production of special crops, a ridging multi-plant composite planting mode of the salt-tolerant plants and the *Acanthus ilicifolius* with good tolerance and high economy is fully utilized, salts on the ridges are rinsed into the furrows by means of natural precipitation and irrigation; the *Acanthus ilicifolius* that have been planted in the furrows excretes redundant salts by using salt glands; the salt-tolerant plant and the *Acanthus ilicifolius* are harvested to effectively remove salts, thereby achieving an effect of reducing salts in soil by a dual-function of the ridges and the furrows; in addition, a plurality of plant growth and metabolism activities, a root penetration function, and a humification function of dry branches and fallen leaves as well as dead roots of the salt-tolerant plant and the *Acanthus ilicifolius* can improve physical and chemical properties of soil; the selected plants have higher ecological, medicinal and economic values, and compared with the conventional restoration method, the method has the advantages of implementing high comprehensive desalting efficiency, improving soil fertility, implementing high soil acidity and alkalinity reduction efficiency, and can better and more quickly perform soil restoration, and have higher economic and ecological benefits in long-term considerations.

(1) The present disclosure provides the salt-tolerant plants of the iced vegetable, the corn, the new zealand spinach and the endive that can normally grow in the saline land, and has high economic benefit; the salt-secreting mangrove plant of *Acanthus ilicifolius* is combined, and has strong salt-secreting effect, to reduce the salt content in the soil, and the salt-secreting amount is increased along with the increase of the environmental salinity. The interpenetration of various plants of the *Acanthus ilicifolius* and the salt-tolerant plants through growth and metabolism activities and root systems, the physical properties such as soil bulk density, a total porosity, permeability and a total aggregate can be improved. The humification function of dry branches and fallen leaves as well as dead roots of the plant can increase organic matters of the soil, promote the growth and the propagation of microorganisms in the soil, improve a nutrient status and the chemical properties of the soil, improve the soil fertility and reduce the soil salinity and alkalinity.

(2) The present disclosure adopts the whole-mulching double-ridge model to form the ridging multiple-plant composite planting mode for planting the salt-tolerant plants on the ridges, and planting the canthus ilicifolius in the furrows, and salts on the ridges are rinsed into the furrows by means of natural precipitation and irrigation, which is conducive to rapid soil desalination; the *Acanthus ilicifolius* that have been planted in the furrows excretes redundant salts through strong salt secretion, thereby achieving a dual function of reducing the salts in the soil.

(3) The present disclosure provides the body of the ridge is perpendicular to the direction of the coastline, so that redundant rainwater can be discharged in heavy rainy days, so that the organic matters in the soil can be better protected, and the salt in the soil can be better discharged.

(4) According to the present disclosure, the fertilizer is prepared by fermenting the cow dung, the coconut chaff, the seaweed residues, the corn cob cores, the banana stalk, the derris roots and the *Bacillus subtilis* powder in a scientific proportion, so that a restoration effect of seawater back-flowing into the farmland in the tropical region can be obviously improved, and the porosity, the organic matters and the salt content of the soil to be restored are obviously improved. The special fertilizer of the present disclosure not only promotes the growth of the salt-tolerant plants and the *Acanthus ilicifolius*, but also is beneficial to improving the soil property thereof.

DETAILED DESCRIPTION

Reference will now be made in detail to embodiments, examples of which are illustrated in the following detailed description, numerous specific details are set forth in order to provide a thorough understanding of the subject matter presented herein.

Unless otherwise specified, experimental methods used in embodiments of the present disclosure are conventional methods.

Materials and reagents used in the embodiment of the present disclosure can be obtained from commercial channels without specific descriptions.

A First Embodiment

An ecological restoration method for seawater back-flowing farmlands in a tropical region includes the following steps: performing soil ridging on the seawater back-flowing saline-alkalized land by using a whole-mulching double-ridge model thereof, wherein a ridge body that has been ridged is a trapezoidal structure, and perpendicular to a direction of the coastline; a width of a big ridge is about 70 cm, a height of the big ridge is about 15 cm, a width of a small ridge is about 40 cm, a height of the small ridge is about 20 cm, and a bottom width of the furrow is about 10 cm; and planting corns on big ridges, planting iced vegetables (from February to mid June) and endive (from late June to September) on small ridges, and planting *Acanthus ilicifolius* in furrows. A conventional water and fertilizer management mode is used during planting the above plants.

A Second Embodiment

A difference between the second embodiment and the first embodiment is that: in the second embodiment of the present disclosure, before planting the above plants and the *Acanthus ilicifolius*, 5 kg/mu of fertilizer is applied on the ridges, and wherein the fertilizer is prepared by the following raw materials in parts by weight: 30 parts of cow dung, 38 parts of coconut chaff, 12 parts of seaweed residues, 25 parts of corn cob cores, 20 parts of banana stalk, 3 parts of derris roots and 2 parts of *Bacillus subtilis* powder; a preparation method of the fertilizer includes the following steps: crushing the banana stalk, the corn cob cores and the derris roots, placing the banana stalk, the corn cob cores and the derris roots under a condition of 2.3 MPa for performing steam explosion for 10 minutes, to obtain steam explosion materials, adding the coconut chaff and the seaweed residues into the steam explosion materials for uniformly mixing, and then adding the *Bacillus subtilis* powder for further stirring and mixing, spraying water to wet the materials, and fermenting for 3 days, to obtain the target fertilizer.

A Third Embodiment

A difference between the third embodiment and the second embodiment is that: in the third embodiment of the present disclosure, the fertilizer is prepared by the following raw materials in parts by weight: 25 parts of cow dung, 30 parts of coconut chaff, 10 parts of seaweed residues, 20 parts of corn cob cores, 15 parts of banana stalk, 2 parts of derris roots and 2 parts of *Bacillus subtilis* powder.

A Fourth Embodiment

A difference between the fourth embodiment and the second embodiment is that: in the fourth embodiment of the present disclosure, the fertilizer is prepared by the following raw materials in parts by weight: 35 parts of cow dung, 50 parts of coconut chaff, 20 parts of seaweed residues, 30 parts of corn cob cores, 25 parts of banana stalk, 5 parts of derris roots and 4 parts of *Bacillus subtilis* powder.

A difference between a first comparative example and the first embodiment is that: in the first comparative example, the *Acanthus ilicifolius* rather than *Avicennia marina* is planted in the furrows.

A difference between a second comparative example and the first embodiment is that: in the second comparative example, the ridge body that has been ridged is parallel to the direction of the coastline.

A difference between a third comparative example and the second embodiment is that: in the third comparative example, the cow dung is replaced with an equal amount of chicken dung and the banana stalk is replaced with an equal amount of corn stalk.

A difference between a fourth comparative example and the second embodiment is that: in the fourth comparative example, the raw material for preparing the fertilizer isn't performed steam explosion, and includes the following steps: crushing the banana stalk, the corn cob cores and the derris roots, adding the cow dung, the coconut chaff and the seaweed residues for uniformly mixing, and then adding the *Bacillus subtilis* powder for further stirring and mixing, spraying water to wet the materials, and fermenting for 3 days, to obtain the fertilizer.

A Test Example

A seawater back-flowing farmland in a tropical region in Danzhou city, Hainan province is selected as an experimental object and randomly divided into experimental regions with an equal area, an area of each experimental region is 1 mu, and a saline-alkalized level of each experimental region is basically consistent. the ecological restoration method of the first to fourth embodiments and the ecological restoration method of the first to fourth comparative examples are respectively used to restore the above seawater back-flowing farmland, comparing the physicochemical properties of the soil (a soil layer of 0-40 cm) before performing restoration and after performing restoration for one year, and taking test data from an average value of data that has been measured by five collection points in each experimental region.

(1) Water holding capacity of field soil is measured by a ring cutter method. Wherein, water holding capacity= (wet soil weight-dry soil weight)/dry soil weight× 100%.

(2) Porosity=(1-soil bulk density/soil specific gravity)× 100%; wherein the soil bulk density was determined by the ring cutter method.

(3) Organic matter content (%): is determined by a potassium dichromate volumetric method, that is, a quantitative potassium dichromate sulfuric acid solution is used to oxidize the organic matters in the soil under a condition of electric heating, and residual potassium dichromate is titrated by a ferrous sulfate standard solution, silica is used as an additive for actual blank calibration, the organic carbon content is calculated according to a mass difference of oxidants before and after oxidation, and then the organic carbon content is multiplied by a coefficient 1.724 (the coefficient converted from organic carbon to organic matters), so that the organic matter content of the soil is obtained.

(4) A total salt content (%): is determined by a weight method, that is, a certain amount of soil extract is absorbed into a porcelain evaporation vessel, and evaporated to dryness on a water bath, and then oxidizing organic matters with $H_2O_2$, drying in a drying oven at 105° C., weighing to obtain a weight of drying residue e, wherein (a weight of drying residue/a weight of soil sample)×100% is the total salt content.

A result is as follows:

|  | Average porosity / % | | Percentage increase in porosity | Average organic matter / % | | Percentage increase of organic matter | Average total salt / % | | reduction percentage of total salt |
| --- | --- | --- | --- | --- | --- | --- | --- | --- | --- |
|  | Before restoration | After restoration |  | Before restoration | After restoration |  | Before restoration | After restoration |  |
| First embodiment | 40.96 | 53.16 | 29.79% | 0.2741 | 0.4016 | 46.52% | 2.058 | 0.967 | 53.01% |
| Second embodiment | 40.08 | 58.71 | 46.48% | 0.2705 | 0.4891 | 80.81% | 2.066 | 0.311 | 84.95% |
| Third embodiment | 40.01 | 56.56 | 41.36% | 0.2840 | 0.4634 | 63.17% | 2.035 | 0.526 | 74.15% |
| Fourth embodiment | 39.41 | 55.48 | 40.78% | 0.2713 | 0.4528 | 66.90% | 2.053 | 0.508 | 75.26% |
| First comparative example | 40.16 | 49.08 | 22.21% | 0.2809 | 0.3352 | 19.33% | 2.030 | 1.440 | 29.06% |
| Second comparative example | 40.03 | 51.62 | 28.95% | 0.2710 | 0.3451 | 27.34% | 2.062 | 1.508 | 26.87% |
| Third comparative example | 41.91 | 55.54 | 32.52% | 0.2790 | 0.4398 | 57.63% | 2.036 | 0.813 | 60.09% |
| Fourth comparative example | 41.78 | 56.32 | 34.80% | 0.2742 | 0.4525 | 65.03% | 2.017 | 0.709 | 64.83% |

The above result shows that the porosity and the organic matter content of the soil after performing restoration are obviously increased, and the total salt content is obviously reduced, which indicates that the restoration method of the first to fourth embodiments of the present disclosure has an obvious restoration effect on the seawater back-flowing farmland in the tropical region. Particularly, the restoration effects of the second to fourth embodiments are better, wherein the restoration effect of the second embodiment is the best.

A comparison between the first embodiment and the second embodiment shows that the self-made fertilizer provided in the present disclosure has an obvious influence on the porosity, the organic matter and the salt content of the soil, and the restoration effect of the seawater back-flowing farmland in the tropical region is obviously improved. Compared the second embodiment with the third and fourth comparative examples, it further shows that the self-made fertilizer greatly improves the restoration effect of the seawater back-flowing farmland in the tropical region.

A comparison between the first and second comparative examples, and the second embodiment shows that the *Acanthus ilicifolius* is planted in the furrow and the ridge body is arranged perpendicular to the direction of the coastline have great affected on the porosity, the organic matter and the salt content of the soil, and the restoration effect is obviously improved.

In addition, the corns, the iced vegetable, the endive and the *Acanthus ilicifolius* planted in each experimental region of the first to fourth embodiments of the present disclosure can grow normally, and an overall economic benefit is high.

The above description is only for a preferred embodiment of the present disclosure and is not intended to limit the present disclosure. Any variation or replacement made by one of ordinary skill in the related art without departing from the spirit of the present disclosure shall fall within the protection scope of the present disclosure.

What is claimed is:

1. An ecological restoration method for seawater back-flowing farmlands in a tropical region comprising the following steps:

performing soil ridging on a seawater back-flowing saline-alkalized land by using a whole-mulching double-ridge model thereof, wherein a ridge body that has been ridged is a trapezoidal structure, and perpendicular to a direction of a coastline; and planting a salt-tolerant plant on ridges, and planting acanthus ilicifolius in furrows.

2. The ecological restoration method as claimed in claim 1, wherein before planting the salt-tolerant plant and the acanthus ilicifolius, 4-6 kg/mu of fertilizer is applied on the ridges, and wherein the fertilizer is prepared by the following raw materials in parts by weight: 25-35 parts of cow dung, 30-50 parts of coconut chaff, 10-20 parts of seaweed residues, 20-30 parts of corn cob cores, 15-25 parts of banana stalk, 1-5 parts of derris roots and 2-4 parts of *Bacillus subtilis* powder.

3. The ecological restoration method as claimed in claim 2, wherein the fertilizer is prepared by the following raw materials in parts by weight: 30 parts of cow dung, 38 parts of coconut chaff, 12 parts of seaweed residues, 25 parts of corn cob cores, 20 parts of banana stalk, 3 parts of derris roots and 2 parts of *Bacillus subtilis* powder.

4. The ecological restoration method as claimed in claim 3, wherein a preparation method of the fertilizer comprises the following steps: crushing the banana stalk, the corn cob cores and the derris roots, placing the banana stalk, the corn cob cores and the derris roots under a condition of 2.3 MPa for performing steam explosion for 10-12 minutes, to obtain steam explosion materials, adding the cow dung, the coconut chaff and the seaweed residues into the steam explosion materials for uniformly mixing, and then adding the *Bacillus subtilis* powder for further stirring and mixing, spraying water to wet the materials, and fermenting for 2-4 days, to obtain the target fertilizer.

5. The ecological restoration method as claimed in claim 2, wherein a preparation method of the fertilizer comprises the following steps: crushing the banana stalk, the corn cob cores and the derris roots, placing the banana stalk, the corn cob cores and the derris roots under a condition of 2.3 MPa for performing steam explosion for 10-12 minutes, to obtain steam explosion materials, adding the cow dung, the coconut chaff and the seaweed residues into the steam explosion materials for uniformly mixing, and then adding the *Bacillus subtilis* powder for further stirring and mixing, spraying water to wet the materials, and fermenting for 2-4 days, to obtain the target fertilizer.

6. The ecological restoration method as claimed in claim 1, wherein the salt-tolerant plant comprises one or more of corn, iced vegetable, common *tetragonia* herb and endive.

7. The ecological restoration method as claimed in claim 6, wherein the corn is planted on big ridges, and one or more of the iced vegetable, the common *tetragonia* herb and the endive are planted on small ridges.

8. The ecological restoration method as claimed in claim 1, wherein a width of the big ridge is 65-75 cm, a height of the big ridge is 13-16 cm, a width of the small ridge is 35-45 cm, a height of the small ridge is 18-22 cm, and a bottom width of the furrow is 8-10 cm.

9. The ecological restoration method as claimed in claim 8, wherein the width of the big ridge is 70 cm, the height of the big ridge is 15 cm, the width of the small ridge is 40 cm, the height of the small ridge is 20 cm, and the bottom width of the furrow is 10 cm.

10. The ecological restoration method as claimed in claim 1, wherein an average salt content of the seawater backflowing farmlands in the tropical region before performing restoration is 2 to 3 percent.

* * * * *